United States Patent [19]

Eldridge

[11] Patent Number: 5,253,920
[45] Date of Patent: Oct. 19, 1993

[54] GAS CAP APPARATUS

[76] Inventor: Bernard Eldridge, 21 Captains Row, Orleans, Mass. 02653

[21] Appl. No.: 959,983

[22] Filed: Oct. 13, 1992

Related U.S. Application Data

[63] Continuation-in-part of Ser. No. 787,827, Nov. 5, 1991, abandoned.

[51] Int. Cl.$^5$ .............................................. B62D 39/00
[52] U.S. Cl. ................................. 296/97.22; 220/86.2
[58] Field of Search .................... 296/97.22; 220/86.2; 280/834

[56] References Cited

U.S. PATENT DOCUMENTS

| | | | |
|---|---|---|---|
| 4,185,844 | 1/1980 | Hubbard et al. | 280/834 |
| 4,746,089 | 5/1988 | Clapper | 248/309.4 |
| 5,066,062 | 11/1991 | Sekalovski | 296/97.22 |
| 5,072,986 | 12/1991 | Tai et al. | 296/97.22 |

*Primary Examiner*—Robert R. Song
*Attorney, Agent, or Firm*—Thomas A. Kahrl

[57] ABSTRACT

A gas cap for sealing a gas tank adapted to be permanently mounted on a vehicle and a combination of gas cap and fender device for connecting the gas cap to the vehicle, the gas cap being attached to an access plate having a contoured recess hingably attached to a fender of the vehicle pivotal between a closed position and an open position containing a gas tank with a filler tube extending from the tank and attached to the fender wherein the filler tube includes a neck member provided with a threaded fitting and a gas cap comprising a cap of disk shaped construction with a transverse handle member for pivotal rotation, a cylindrical journal member, longitudinally slideable between an inner sealing position and an outer disengaged position, a sleeve, a threading device provided on the closure means for engaging the neck member and a retaining device adapted for preventing the removal the gas cap from the access plate providing a permanent connection to the vehicle.

11 Claims, 1 Drawing Sheet

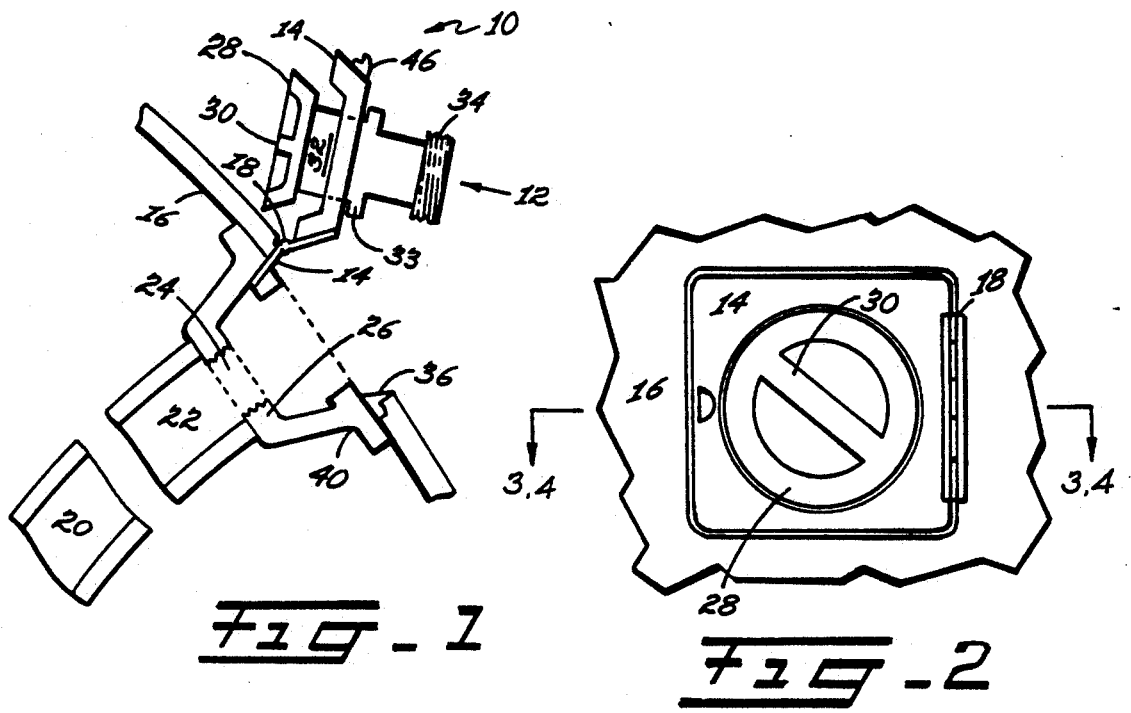
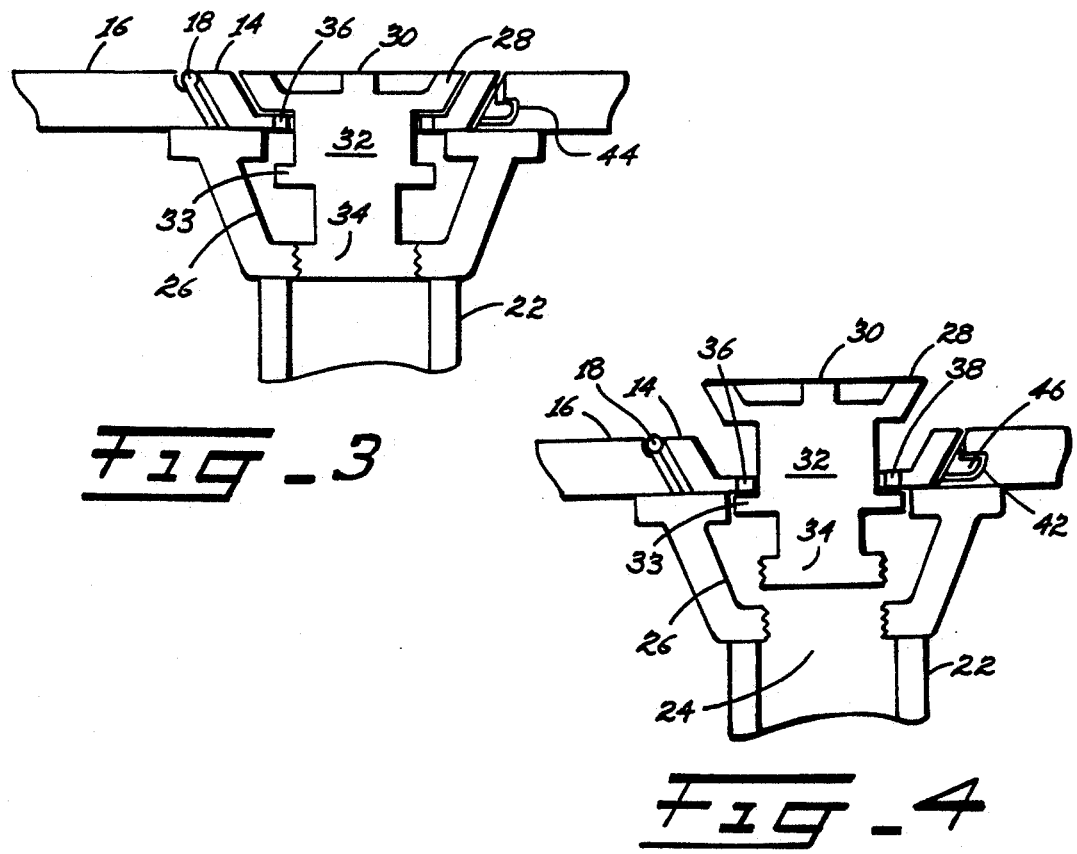

GAS CAP APPARATUS

This application is a continuation-in-part of U.S. patent application Ser. No. 07/787,827 filed Nov. 5, 1991, abandoned, which is incorporated herein by reference.

BACKGROUND OF THE INVENTION

It is well recognized that replacement of a gas cap on a filler tube of a vehicular fuel tank, in particular an automobile fuel tank is important. Historically, this task has been performed by gas station attendants after pumping fuel into a fuel tank at the request of a vehicle operator. Such attendants normally check to see that the fuel tank cap, is properly replaced on the filler pipe of the fuel tank, upon completion of pumping fuel in the tank to insure that, for reasons of safety and economy, fuel does not leak or splash out of an otherwise open filler tube. Furthermore, by sealing the filler tube with the gas cap fumes do not escape from the open filler tube to the outer air, or into the interior of the vehicle to the discomfort and hazard of the occupants.

With the advent of self-service gas stations, operators of vehicles, in particular automobiles, now pump fuel into their own fuel tanks and, not being accustomed to fueling their cars on a daily basis, frequently forget to replace their gas caps. Typically, a common mistake is to place the gas cap on an automobile roof or fender, or alternatively on a gas pump, while the operator pumps fuel into the gas tank via the open filler tube. Upon completion of pumping, the operator then must leave the pump island and go to the cashier's office in a gas station for the purpose of paying for the fuel. Upon return to the car, having forgotten to replace the gas cap, the operator departs the gas station and not until many miles later recognizes that gas cap is missing, at which point the gas cap has long since dropped off, and the filler tube is uncapped and open.

Accordingly, it is therefore desirable to provide for a new and improved gas cap apparatus whereby the gas cap is permanently connected to the vehicle to overcome at least some of the disadvantages of prior art gas caps.

SUMMARY OF THE INVENTION

The invention relates to an improved gas cap apparatus for use with an enclosing filler tube of a fuel tank mounted on a vehicle and to the combination of the gas cap and fender apparatus of the vehicle.

In particular, a gas cap apparatus has been discovered for use in combination with a vehicle fender, typically a rear panel, comprising a gas cap including a cylindrical journal member having an outer and inner end, a cap mounted on the outer end, a retainer column mounted on the cylindrical journal member, and a threaded adapter mounted on the inner end of said journal member. The gas cap is connected to an access plate, hingedly mounted on the vehicle, typically to a rear fender member located adjacent to the filler tube's orifice, movably connected by one or more hinges to the fender. The access plate includes a swaged recess, hingedly mounted on the fender, having a sleeve to receive the cylindrical journal member of said gas cap such that the gas cap is free to slide inwardly and outwardly a defined distance as well as permitting rotation of the gas cap about a central axis, alternately clockwise and counterclockwise. Said access plate is also adapted to move the gas cap apparatus between an open position and a closed sealed position in relation to the filler tube. Said hinge mount also retains the gas cap in a connected relationship to the vehicular body to prevent loss thereof.

In the preferred embodiment, the gas cap apparatus is rotatably positioned on the access plate mounted on one or more hinge members attached to the vehicle, particularly the fender of the vehicle, for movement between an open position and a closed position to engage the filler tube for sealing said filler tube. The hinge member is attached to a rear fender on the body of the vehicle having an opening provided in the fender having a generally rectangular size, said opening being provided to provide access through the fender for a conventional hose and nozzle apparatus. The access plate includes a swaged recess configured to accept the cap when the gas cap is moved inwardly, and includes a central circular opening for mounting the sleeve for cooperation with the outer surface of the cylindrical journal. Mounted on the interior surface of the fender opening is a latch mechanism of known construction to those skilled in the art for latching the access plate in a closed position. The latching mechanism is connected to by conduit to the dash board of the vehicle and may be operated by the operator to insure and may be remotely operated by the operator to insure that the hinged access plate once closed and latched remains locked and inaccessible until it is released. tank.

As provided in this embodiment, the cap is integrally secured to the outer end of the gas cap, adapted for rotation responsive to manually urging about an axis perpendicular to the plane of the surface of the access plate, and in the preferred embodiment includes a handle device for manual operation, and is of circular disk shape. The cylindrical journal is slidably received by a sleeve provided in the access plate, said sleeve providing a sliding bearing surface for cooperating with the cylindrical journal to permit longitudinal movement between the inner sealed position and the raised detached position.

The filler tube, in the preferred embodiment, is provided with a one end and other end, the one end mounted on the rear fender adjacent the fender opening, the other end attached to the fuel tank for providing the a conduit for the flow of fuel. A neck member is provided at the one end of the filler tube, of annular construction having an annular peripheral edge and including an internal threaded member extending from the peripheral edge of the neck inwardly along the inner diameter of the filler tube. The threaded member is adapted to cooperatively engage the threaded adapter having associated external threads mounted on the inner end of the gas cap to provide closure of the neck member of the filler tube.

The invention will be described for the purpose of illustration only in connection with certain embodiments; however, it is recognized that those persons skilled in the art may make various changes, modifications; improvements and additions on the illustrated embodiments all without departing from the spirit and scope of the invention.

BRIEF DESCRIPTION OF THE DRAWINGS

FIG. 1 A view from the side, in section and cutaway, of the gas cap of the invention showing the gas cap in a disengaged position away from the neck of the filler tube.

FIG. 2 A plan view of the gas cap from above of the inventions of FIG. 1.

FIG. 3 A side sectional view of the gas cap of FIG. 1 taken along lines 3—3 of FIG. 2 showing the gas cap in the closed position.

FIG. 4 A side sectional view of the gas cap of FIG. 1 taken along lines 3—3 of FIG. 2 showing the gas cap in the raised disengaged position.

DETAILED DESCRIPTION OF THE PREFERRED EMBODIMENT

With reference to the drawings FIG. 1 shows a combination gas cap and fender apparatus 10 comprising a gas cap apparatus 12 rotatably mounted on a access plate 14, said access plate being attached to a fender 16 by a hinge member 18.

As shown in FIG. 1 a filler tube 22 of tubular construction extending from the gas tank 20 not shown to the fender 16 having an orifice 24 and an interior threaded device 26 extending from the said orifice 24 inwardly along the inner surface of the filler tube 22 as shown in FIGS. 1, 3, and 4.

The gas cap apparatus 12 shown in FIGS. 3 and 4 comprises a disk shaped cap 28 having a transverse handle 30, said cap being attached to the outer end of a cylindrical journal member 32 having an inner end to which is attached a threaded adapter 34 having external threads. The gas cap apparatus 12 is hingedly mounted on the fender 16 by hinge 18 for movement between the raised disengaged position shown in FIG. 4, wherein in an open position as shown in FIG. 1, the access plate extends in substantially orthogonical relationship with fender 16. The access plate 14 is provided with a sleeve 36, as shown in FIG. 3, fitted on the circumference of an annular opening 38 in said access plate. The cylindrical journal member 32 is positioned coaxially in the sleeve 36 adapted to permit sliding movement of said gas cap between an inner engaged position as shown in FIG. 3 and a raised, disengaged position shown in FIG. 4 with retainer collar 33 abutting base 35 as well as-for rotation about an longitudinal axis of the gas cap perpendicular to the surface of the access plate. Positioned at the mid-section of the cylindrical journal member 32, the retained collar, 33 provides a stop for preventing removal of the gas cap apparatus 12 from the access plate, 14 as is shown in FIG. 4.

A latch device 42 is attached to the inner surface of the fender 16 having a conduit 44 extending to an operator panel not shown adapted to engage a second latch device 46 positioned on the inner surface of the access plate 14 for locking the access plate 14 in a closed position to prevent unauthorized entry.

Closure of the filler tube 22 is provided by sequentially pivoting the access plate 14 between an outwardly depending perpendicular relationship with the fender 16 wherein the gas cap apparatus 12 is spaced away from the filler tube 22 as shown in FIG. 1 to the raised disengaged position as shown in FIG. 4 then slidable inwardly to an inner sealed position as shown in FIG. 3 wherein, by manual operation, the gas cap 12 is twisted in a clockwise direction such that the threaded adapter 34 is threaded into the threaded device 26 to provide a secure closure of said filler tube 22. Opening of the filler tube is performed by disengaging the latch 42 manually turning the gas cap by means of the handle 30 in a counterclockwise position wherein the gas cap apparatus 12 is threadedly disengaged from the filler tube 22 and slidably raised to the point where the retaining collar 33 abuts the base of the access plate 14, permitting said access plate and gas cap apparatus to be pivoted outwardly from said filler tube to provide access for filling the tank by means of a nozzle not shown.

What is claimed is:

1. A gas cap apparatus permanently installed on a vehicle for removably sealing the vehicle's fuel tank filler tube comprising:
    a) an access plate having an outer rim adjacent a contoured recess characterized by a central annular opening and including hinge means for mounting said access plate on the vehicle for movement between an open position and a closed position;
    b) said filler tube includes an orifice and an associated threaded member in the neck of said filler tube,
    c) a gas cap movably connected to said access plate permitting rotation about a central axis comprising;
        i) a cylindrical journal having cylindrical surface configured to cooperate with said annular opening having a top end and a bottom end, and a retainer collar positioned between said top end and bottom end of said sliding journal;
        ii) a cap mounted coaxially on the top end of the sliding journal including a handle member;
        iii) a threaded adapter mounted coaxially on said bottom end configured to engage said associated threaded member in the neck of said filler tube;
    d) means for manually urging the gas cap in engagement with the neck of said filler tube, whereby the threaded adapter sealably engages the associated threaded member of the filler tube; wherein the gas cap is operable to slide between an inner sealing position and a raised detached position and for pivotal movement with the access plate between a closed position and an open position.

2. The gas cap apparatus of claim 1 wherein the filler tube has a collar attached to the distal end of the filler tube for securing the filler tube to a fender.

3. The gas cap apparatus of claim 1 wherein the access plate includes a sleeve mounted in the annular opening of said access plate having a sliding bearing surface to cooperate with the cylindrical journal to permit sliding axial and longitudinal movement of said cylindrical journal.

4. The gas cap apparatus of claim 1 wherein the access plate includes a central recess configured to accept the cap when the gas cap is in the inner engaged position.

5. The gas cap apparatus of claim 1 wherein the internal threaded means of the filler tube comprises female threads adapted to cooperate with external threaded means of the cap means.

6. The gas cap apparatus of claim 1 wherein the handle member comprises a transverse, manually-operated handle.

7. The gas cap apparatus of claim 1 wherein the threaded adapter comprises external threads adapted to sealably engage and disengage the internal threaded member of the neck member, enabling firstly engagement and secondly disengagement with the filler tube by turning the handle in a counter-clockwise direction for opening and in a clockwise direction for sealing the filler tube.

8. The gas cap apparatus of claim 1 wherein a latch is provided on the access plate adapted for remote operation.

9. The gas cap apparatus of claim 1 wherein the gas cap apparatus may be remotely operated by control means.

10. The gas cap apparatus of claim 8 wherein a gasket is provided for a seal between the gas cap apparatus and the neck of said filler tube.

11. A gas cap apparatus in combination with a vehicle body comprising:
   a) a vehicle body member comprising a fender;
   b) a access plate characterized by an annular opening, including a hinge means for permanently mounting said access plate on the vehicle for movement between an open position and a closed position;
   c) a filler tube, including a neck member connected to the fuel tank having internal thread means;
   d) a closure means for removably sealing the filler tube rotably mounted on the access plate comprising;
      i) a cylindrical journal having a longitudinal axis and a first and second end;
      ii) a gas cap mounted coaxially on the first end of the cylindrical journal;
      iii) external threaded means for engaging and disengaging the internal threaded means of the filler tube, said external threaded means mounted on the second end of the cylindrical journal coaxially therewith;
   e) a sleeve mounted in the annular opening of the access plate having a sliding bearing surface to cooperate with the cylindrical journal to permit rotational movement of said cylindrical journal about the longitudinal axis thereof and to permit sliding movement between an inner sealing position and an outer disconnected position;
   f) retaining means for retaining the gas cap in engagement with the sleeve, whereby the gas cap being connected to the access plate, is rotated by the handle means to sealably engage and disengage the filler tube.

* * * * *